United States Patent [19]

Saito et al.

[11] Patent Number: 5,403,646
[45] Date of Patent: Apr. 4, 1995

[54] MAGNETIC RECORDING MEDIUM COMPRISING A MAGNETIC LAYER AND A NON-MAGNETIC SUPPORT EACH HAVING SPECIFIED ELASTIC MODULUS VALVES

[75] Inventors: Shinji Saito; Hitoshi Noguchi; Kazuo Kato, all of Kanagawa, Japan

[73] Assignee: Fuji Photo Film Co., Ltd., Kanagawa, Japan

[21] Appl. No.: 47,288

[22] Filed: Apr. 19, 1993

[30] Foreign Application Priority Data

Apr. 21, 1992 [JP] Japan ................... 4-101143

[51] Int. Cl.$^6$ ................. G11B 5/00
[52] U.S. Cl. ................. 428/141; 428/215; 428/216; 428/336; 428/473.5; 428/474.4; 428/480; 428/694 SL; 428/694 SG; 428/900
[58] Field of Search ........... 428/694 SL, 694 SG, 428/215, 216, 141, 336, 480, 474.4, 473.5, 900

[56] References Cited

U.S. PATENT DOCUMENTS

| | | | |
|---|---|---|---|
| 4,187,341 | 2/1980 | Suzuki et al. | 428/213 |
| 4,561,034 | 12/1985 | Akahane et al. | 360/134 |
| 4,710,421 | 12/1987 | Ono et al. | 428/213 |
| 4,781,964 | 11/1988 | Mizuno et al. | 428/141 |
| 4,804,736 | 2/1989 | Utsumi | 528/176 |
| 4,857,388 | 8/1989 | Ogawa et al. | 428/212 |
| 5,051,292 | 9/1991 | Katoh et al. | 428/141 |
| 5,069,949 | 12/1991 | Matsuda et al. | 428/141 |
| 5,196,265 | 3/1993 | Ryoke et al. | 428/332 |

FOREIGN PATENT DOCUMENTS 50-45877  4/1975  Japan .

*Primary Examiner*—Stevan A. Resan
*Attorney, Agent, or Firm*—Sughrue, Mion, Zinn, Macpeak & Seas

[57] ABSTRACT

Disclosed is a magnetic recording medium which is improved in electromagnetic conversion and running durability which includes a magnetic layer containing a ferromagnetic powder dispersed in a binder on a non-magnetic support, wherein the sum of the elastic modulus in a longer direction of the non-magnetic support and the elastic modulus in a width direction of the non-magnetic support is 1,250 kg/mm$^2$ or more; an elastic modulus in a longer direction of the magnetic layer is 0.6 to 3.0 times as much as the elastic modulus in the longer direction of the non-magnetic support; and an elastic modulus in a width direction of the magnetic layer is 0.4 to 2.0 times as much as the elastic modulus in the width direction of the non-magnetic support.

13 Claims, No Drawings

MAGNETIC RECORDING MEDIUM COMPRISING A MAGNETIC LAYER AND A NON-MAGNETIC SUPPORT EACH HAVING SPECIFIED ELASTIC MODULUS VALVES

FIELD OF THE INVENTION

The present invention relates to a magnetic recording medium, which is improved in electromagnetic conversion and running durability. Specifically, the magnetic recording medium exhibits improved dropping of scratched powder at the tape edge portion and output reduction in audio and video applications.

BACKGROUND OF THE INVENTION

In recent years, particularly in magnetic recording medium for video, the thickness of the medium is decreased in order to increase recording and reproducing time. However, the thickness reduction weakens the mechanical strength of the magnetic recording medium, and when it is loaded in a cassette or cartridge, an edge portion contacts a guide means for controlling the running of the magnetic tape and a flange edge for regulating the magnetic tape during recording, reproducing, fast forwarding, rewinding, loading, and unloading. This causes buckling and breaking in some cases. In addition, curls and wrinkles are liable to be generated.

This allows for the production of a reinforced film, which is extended in a longer direction (i.e., tape-running direction) or width direction (i.e., tape-width direction, transverse direction) to produce a plastic film such as a polyester film to use as a substrate film for a magnetic tape. Further, it has been attempted to improve not only the substrate film but also the mechanical strength of the magnetic tape by forming a magnetic layer having a high elastic modulus on the substrate film, that is, a non-magnetic support. However, this is not sufficient, and the thickness of the magnetic tape, which becomes thin, can not effectively prevent buckling and breaking of the tape edge portion.

JP-A-50-45877 (the term "JP-A" as used herein means an unexamined published Japanese patent application) and U.S. Pat. No. 4,804,736 (corresponding to JP-A-62-135339) disclose using products having a high strength as a support. JP-A-50-45877 discloses a biaxially oriented film consisting of polyethylene-2,6-naphthalate having a Young's modulus of 51,000 kg/cm$^2$ or more in a longer direction and 68,000 kg/cm$^2$ or more in a width direction. Further, U.S. Pat. No. 4,804,736 discloses a polyethylene-2,6-naphthalate film for a high density magnetic recording having excellent heat resistance with a Young's modulus of 800 kg/mm$^2$ or more in a longer direction and 600 kg/mm$^2$ or more in a width direction. However, the importance of the Young's modulus in the magnetic layer has not been recognized.

U.S. Pat. No. 4,187,341 (corresponding to JP-A-53-66202) discloses a magnetic recording tape which has a total thickness of 4.0 to 14.5 μm, a ratio of a non-magnetic support thickness to a magnetic layer thickness of 2:3 to 3:2, a ratio of Young's modulus of the non-magnetic support to that of the magnetic layer of 1:2 to 2:1 and a tensile strength at a 0.5% elongation of d$^{0.5}$/16 kg or more based on the total thickness d (μm) of the magnetic recording medium.

It has been found by this proposal that a mere increase in the Young's modulus of the raw material is insufficient, and the Young's modulus of the magnetic layer is increased as much as possible, while the Young's moduli of the non-magnetic support and the magnetic layer are kept at almost the same value. At the same time, the non-magnetic thickness and the magnetic layer thickness have almost the same value, whereby a magnetic recording tape having practical durability can be obtained. In this proposal, however, the importance of directionality in a longer direction and a width direction is not recognized, and there are insufficient improvements in running durability, such as dropping of scratched powders at the tape edge portion, and insufficient reduction in audio and video output.

In order to solve the problems mentioned above, for example, U.S. Pat. No. 4,561,034 (corresponding to JP-A-58-91528) discloses a magnetic recording medium having a total thickness of 17 μm or less which comprises a magnetic layer on one side of a flexible non-magnetic support of high molecular weight material, and a back layer on the opposite side thereof; wherein an elastic modulus (Young's modulus) of the magnetic layer is higher than that of the non-magnetic support and is 1,200 kg/mm$^2$ or more in the sum of the elastic moduli in the longer direction and wide direction at a 1% elongation; and wherein an elastic modulus of the back layer is higher than that of the non-magnetic support and is 1,200 kg/mm$^2$ or more in the sum of the elastic moduli in the longer direction and wide direction at a 1% elongation.

However, the sum of the elastic modulus in the longer direction of the non-magnetic support and the elastic modulus in the width direction thereof was 1,100 kg/mm$^2$, which is well-known, and the problems of running durability, such as dropping of scratched powder at the tape edge portion, an audio and video output reduction could not be sufficiently solved.

Meanwhile, multilayering of a magnetic layer in a magnetic recording medium has been proposed to improve electromagnetic property. For example, U.S. Pat. No. 4,857,388 (corresponding to JP-A-63-103429) discloses a magnetic recording medium comprising a non-magnetic support having two magnetic layers each containing a ferromagnetic powder having a coercive force of 500 Oe (oersted) or more, which is dispersed in a binder, wherein the Young's modulus of a lower magnetic layer (the first magnetic layer) provided on the non-magnetic support is from 500 to 1,000 kg/mm$^2$; the Young's modulus of an upper magnetic layer (the second magnetic layer) provided on the lower magnetic layer is 1,300 kg/mm$^2$ or more; and the Young's modulus of the whole magnetic layer is 900 kg/mm$^2$ or more. This results in a very tough magnetic layer, since the lower magnetic layer is flexible, and the reaction (crosslinking) of a urethane resin (or other resin) with polyisocyanate occurs easily because of the high reactivity of the resin with polyisocyanate. This enables one to obtain a magnetic layer having less reduction of output and excellent durability even after storing over a long period of time.

However, this disclosure also does not indicate the importance of a balance in the Young's moduli of the non-magnetic support and magnetic layer in the longer direction and width direction and can not sufficiently solve the problem of running durability, such as dropping of scratched powders at the tape edge portion and an audio and video output reduction.

The extensive investigations made by the present inventors resulted in the discovery that a relative relationship of the directionality in a magnetic layer strength against that of a non-magnetic support as well as the increase in strength of the non-magnetic support was closely related to these phenomena. That is, it has been found that in a magnetic recording medium in which a conventional support with a high strength is used, an insufficient strength in a magnetic layer versus a high strength in a support and the big difference thereof cause damage to the magnetic layer in running.

This investigation has resulted in a magnetic recording medium having excellent durability which is capable of recording for a longer time.

SUMMARY OF THE INVENTION

An object of the present invention is to provide a magnetic recording medium having excellent durability which is capable of recording for a longer time, and particularly to provide an excellent magnetic recording medium having no dropping of scratched powder at the tape edge portion, no audio output reduction and no video output reduction.

The above and other objects have been achieved by providing a magnetic recording medium comprising a magnetic layer containing a ferromagnetic powder dispersed in a binder on a non-magnetic support, wherein the sum of the elastic modulus in the longer direction of the non-magnetic support and the elastic modulus in the width direction of the non-magnetic support is 1,250 kg/mm$^2$ or more; the elastic modulus in the longer direction of the magnetic layer is 0.6 to 3.0 times as much as the elastic modulus in the longer direction of the non-magnetic support; and the elastic modulus in the width direction of the magnetic layer is 0.4 to 2.0 times as much as the elastic modulus in the width direction of the non-magnetic support.

Further, the above objects have been achieved preferably by providing a magnetic recording medium in which the sum of the elastic modulus in the longer direction of the non-magnetic support and the elastic modulus in the width direction of the non-magnetic support is 1,400 kg/mm$^2$ or more; the elastic modulus in the longer direction of the magnetic layer is 1.0 to 2.0 times as much as the elastic modulus in the longer direction of the non-magnetic support; the elastic modulus in the width direction of the magnetic layer is 0.6 to 1.5 times as much as the elastic modulus in the width direction of the non-magnetic support; and the total thickness of the magnetic recording medium is 15 μm or less.

Further, the above and other objects have been achieved by providing a magnetic recording medium in which the magnetic layer comprises at least two magnetic layers, and the lowest one of the elastic moduli of the magnetic layers each in the longer direction and width direction is 0.5 to 1.0 time as much as the highest one of the magnetic layers.

The above and other objects have further been achieved more preferably by providing a magnetic recording medium in which the non-magnetic support is made of at least one compound selected from polyethylene terephthalate, polyaramide, polyamide, polyimide, and reinforced polyethylene terephthalate.

That is, it has been found that the above objects can be achieved by providing a magnetic recording medium comprising a magnetic layer containing a ferromagnetic powder dispersed in a binder on a non-magnetic support, wherein the sum of the elastic modulus in the longer direction of the non-magnetic support and the elastic modulus in the width direction of the non-magnetic support is 1,250 kg/mm$^2$ or more; the elastic modulus in the longer direction of the magnetic layer is 0.6 to 3.0 times as much as the elastic modulus in the longer direction of the non-magnetic support; and the elastic modulus in the width direction of the magnetic layer is 0.4 to 2.0 times as much as the elastic modulus in the width direction of the non-magnetic support.

Further, the elastic modulus in the longer direction of the magnetic layer is more preferably 1.0 to 2.0 times as much as the elastic modulus in the longer direction of the non-magnetic support, and the elastic modulus in the width direction of the magnetic layer is more preferably 0.6 to 1.5 times as much as the elastic modulus in the width direction of the non-magnetic support.

DETAILED DESCRIPTION OF THE INVENTION

Multilayering of a magnetic layer of a magnetic recording medium has been proposed for trying to improve electromagnetic properties. Such multilayering enables output to be improved over the whole wavelength region and can be combined with a thinner medium to obtain excellent picture quality and sound quality over an extended period of time.

It is disclosed in U.S. Pat. No. 4,857,388 and JP-A2-105326 to control the dynamic characteristic of each layer in a multilayered magnetic recording medium. However, it was found that the multilayered magnetic recording medium, in which a high strength support was used, caused an increase in damage to the magnetic layer due to running to a large extent in some instances. This phenomenon was investigated by the present inventors, and it was found that a large difference between the elastic moduli of the magnetic layers in the respective layers as well as a large difference between magnetic layer strength and non-magnetic support strength as described above caused such problems. It has been found that this problem can be solved by a multilayered magnetic recording medium comprising at least two magnetic layers, wherein the lowest one of the elastic moduli of the magnetic layers each in the longer direction and the width direction is set at 0.5 to 1.0 time as much as the highest one of the magnetic layers, whereby a multilayered magnetic recording medium having excellent durability can be obtained.

It is not known why the magnetic recording medium of the present invention shows excellent durability, but it is thought that the following occurs. The increase in strength of the non-magnetic support can increase the strength of the whole medium, which in turn decreases deformation of the medium due to running. However, it is thought that in a conventional medium, a relatively lower elastic modulus of a magnetic layer than that of a non-magnetic support will cause stress to be concentrated on the edge portion of the magnetic layer having a lower strength when the medium contacts a hub inner material and a deck inner material in running, which results in damage.

There are two components in a longer direction and a width direction for stress to be exerted on by the respective elements, and in the present invention, the elastic modulus of the magnetic layer to that of the non-magnetic support in both directions is set at constant values, that is, 0.6 time or more in the longer direction and 0.4 time or more in the width direction. It is thought that this could prevent such problems.

However, it was found as well that too high an elastic modulus of the magnetic layer was liable to cause damage to the magnetic layer. It is thought that this is because too high an elastic modulus of the magnetic layer against that of the non-magnetic support is liable to cause cracking on the magnetic layer when the deformation of the magnetic layer is in the same level as the deformation of the non-magnetic support. The elastic modulus of the magnetic layer to that of the non-magnetic support is 3.0 times or less in the longer direction and 2.0 times or less in the width direction, preferably 2.0 times or less in the longer direction and 1.5 times or less in the width direction. Also, in a multilayered magnetic layer, controlling the elastic modulus of all the magnetic layers within the scope of the present invention can reduce damage to the magnetic layer due to running. However, a large difference in the elastic moduli between the respective layers does not necessarily provide a good result. It is estimated that the reason for this is because stress is concentrated on the magnetic layer with a lower elastic modulus when it is applied on the edge of the magnetic layer, and a crack generates on a magnetic layer with a high elastic modulus when the deformation of the magnetic layers is the same level as the deformation of the non-magnetic support.

The sum of the elastic moduli in the longer direction and the width direction of the non-magnetic support used in the present invention is generally from 1,250 to 4,000 kg/mm$^2$, preferably from 1,400 to 4,000 kg/mm$^2$, and more preferably from 2,000 to 4,000 kg/mm$^2$. The strengths in the longer direction and width direction thereof can be controlled at the elongation step in film preparation. Each of the elastic moduli in the longer direction and the width direction thereof is selected from 400 to 2,000 kg/mm$^2$.

There can be used as a raw material for the non-magnetic support, publicly known films of polyesters such as polyethylene terephthalate, polyethylene naphthalate, polyolefins, cellulose triacetate, polycarbonate, polyaramide, polyamide, polyimide, polyamidoimide, and polysulfone. Particularly preferred for obtaining a high elastic modulus are polyethylene naphthalate, polyaramide, polyamide, polyimide, and reinforced polyethylene terephthalate. More particularly preferred are polyethylene naphthalate and polyaramide. These non-magnetic supports may be subjected in advance to a corona discharge treatment, a plasma treatment, an easy adhesion treatment, a heat treatment and a dust-preventing treatment.

A center-line average surface roughness (according to JIS B0601) of the non-magnetic support is 0.03 μm or less, preferably 0.01 μm or less, and more preferably 0.005 μm or less. The non-magnetic support preferably has not only a small center-line average surface roughness but also no coarse protrusions of the height of 1 μm or more. The roughness of the surface thereof can be arbitrarily controlled by the size and amount of the fillers added to the non-magnetic support according to necessity. Example of these fillers are oxides of Al, Ca, Si and Ti, carbonates thereof, and an acrylic type organic fine powder.

An F-5 (i.e., a load at a 5% elongation) value of the non-magnetic support in either the longer direction or width direction is 10 kg/mm$^2$ or more, preferably 14 kg/mm$^2$ or more, and more preferably 17 kg/mm$^2$ or more.

The break strength of the non-magnetic support is 20 kg/mm$^2$ or more, preferably 30 kg/mm$^2$ or more, and more preferably 45 kg/mm$^2$ or more.

The percentage of elongation at break of the nonmagnetic support is preferably from 50 to 200%.

The thickness of the non-magnetic support is from 3 to 20 μm, and preferably from 3 to 12 μm for recording for a long time.

The total thickness of the magnetic recording medium of the present invention is generally from 4 to 25 μm, preferably from 4 to 15 μm, and more preferably from 4 to 10 μm for recording for a long time.

The thickness of the magnetic layer is from 0.5 to 7 μm, and preferably from 0.5 to 3 μm for recording for a long time.

Where using a multilayer of magnetic layer, an upper magnetic layer of 0.1 to 1.5 μm is preferred because of the excellent electromagnetic properties thereof.

The present invention can be applied even if the lower layer of the multilayer is a non-magnetic layer comprising primarily of carbon black or $TiO_2$. That is, a non-magnetic layer may be provided under the magnetic layer.

Publicly known raw materials and manufacturing methods can be used for the magnetic layers in the magnetic recording medium of the present invention as described later. The elastic modulus of the magnetic layer of the present invention has to have a prescribed value against that of the non-magnetic support, and therefore suitable conditions described below have to be selected.

The following conditions and methods are available for controlling the elastic modulus of the magnetic layer. That is, the molecular weight of the binder, selection of the primary constitution, controlling the bonding force of a binder with a magnetic substance by a polar group, changing the mixing ratio of hardener and binder, kneading, and controlling by calendaring are available.

Further, there are available for selectively controlling the elastic moduli in a longer direction and a width direction, a method in which an acicular ratio of a magnetic substance is changed, a method in which orientation thereof is changed, and a method in which an amount of a granular non-magnetic powder is changed.

The total thickness of the magnetic layer is 1/20 to 2 times, preferably 1/10 to 1 time, as much as that of the non-magnetic support.

There may be provided between the non-magnetic support and the first layer, a subbing layer for improving adhesiveness or an intermediate layer such as a layer containing carbon black for preventing electrification. The thickness of these layers is from 0.01 to 2 μm, preferably from 0.05 to 0.5 μm.

Further, a back coating layer may be provided on the non-magnetic support side opposite to the magnetic layer. The thickness of this layer is from 0.1 to 2 μm, preferably from 0.3 to 1.0 μm.

Conventional layers can be used as the intermediate layer and back coating layer.

Publicly known materials can be used as the ferromagnetic powder for use in the present invention. Examples thereof include a metal fine powder, iron oxide, cobalt-modified iron oxide, and barium ferrite. Hc (i.e., coercive force) is preferably from 400 to 2,500 Oe. Hc of a lower magnetic layer is preferably smaller than that of an upper magnetic layer because of an improvement in output at low frequency.

The length of the long axis of the ferromagnetic powder is 0.5 μm or less, preferably 0.3 μm or less. The length of the long axis of the ferromagnetic powder contained in the upper magnetic layer is preferably smaller than that of the ferromagnetic powder contained in the lower magnetic layer. The ratio of short axis length to long axis length (i.e., the acicular ratio) is preferably from 2 to 20. The term "long axis" as used herein means the "longest one of the three axes", and the term "short axis" means the "shortest one thereof". A higher acicular ratio can raise the elastic modulus in a longer direction of a magnetic layer relative to the elastic modulus in a width direction thereof. Similarly, a lower acicular ratio can reduce it.

The specific surface area of the ferromagnetic powder is from 25 to 80 $m^2/g$, preferably 35 to 60 $m^2/g$, according to the BET method. A value less than 25 $m^2/g$ increases noise, and a value larger than 80 $m^2/g$ is not preferred because it makes it difficult to obtain proper surface characteristics. The specific surface area of the ferromagnetic powder contained in an upper magnetic layer is preferably larger than that of the ferromagnetic powder contained in a lower magnetic layer.

The crystallite size of the ferromagnetic powder used in the present invention is from 500 to 50 angstroms, preferably from 350 to 150 angstroms. The crystallite size of the ferromagnetic powder contained in an upper magnetic layer is preferably smaller than that of the ferromagnetic powder contained in a lower magnetic layer.

With regard to the magnetic properties of a magnetic recording medium of the present invention as measured at a magnetic field of 5 kOe, the rectangular ratio is 0.7 or more, preferably 0.8 or more, and more preferably 0.9 or more in either the upper magnetic or lower magnetic layer.

$\sigma_s$ (saturation magnetization) of the ferromagnetic powder used in the present invention is 50 emu/g or more, preferably 70 emu/g or more, and that of the ferromagnetic metal fine powder used in the upper magnetic layer is preferably 100 emu/g or more.

The water content of the ferromagnetic powder is preferably 0.01 to 2%. The water content of the ferromagnetic powder is preferably optimized according to the type of binder.

Where iron oxide and cobalt-modified iron oxide are used, the ratio of divalent iron to trivalent iron is preferably form 0 to 20%, more preferably 5 to 10%. The ratio of cobalt atoms to iron atoms in cobalt-modified iron oxide is from 0 to 15%, preferably from 3 to 8%.

The pH value of the ferromagnetic powder is preferably optimized according to the binder used. The pH range thereof is from 4 to 12, preferably from 6 to 10.

The ferromagnetic powder may be subjected to a surface treatment with Al, Si, P, or oxide thereof. The amount thereof is from 0.1 to 10% based on the amount of ferromagnetic powder.

The ferromagnetic powders contained in the first layer and second layer may contain inorganic ions of soluble Na, Ca, Fe, Ni, and Sr in some cases, and an amount of the ions of 500 ppm or less does not specifically affect the characteristics. These ferromagnetic powders may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B.

These ferromagnetic powders, before they are dispersed, may be treated in advance with a dispersant agent, a lubricating agent, a surface active agent, and an antistatic agent, which will be described later.

The ferromagnetic metal powder used in the present invention may contain a small amount of hydroxide or oxide. A ferromagnetic metal powder prepared by a publicly known manufacturing method can be used. Examples of such methods include a method in which reduction is conducted using a composite organic acid salt (e.g., oxalates) and a reducing gas such as hydrogen; a method in which an iron oxide is reduced using a reducing gas such as hydrogen to obtain an Fe or Fe-Co powder; a method in which a metal carbonyl compound is pyrolyzed; a method in which a reducing agent such as sodium boron hydride, hypophosphite and hydrazine is added to a ferromagnetic metal aqueous solution for a reduction; and a method in which metal is vaporized at a low pressure in an inert gas to obtain a fine metal powder. The ferromagnetic alloy powders thus obtained may be treated with a publicly known gradual-oxidizing method, that is, a method in which a ferromagnetic powder is dipped in an organic solvent and then dried; a method in which a ferromagnetic powder is dipped in an organic solvent and then an oxygen-containing gas is blown in to forman oxide layer on a surface thereof, followed by drying; and a method in which the partial pressures of an oxygen gas and an inert gas are adjusted to form an oxide layer on a surface without using an organic solvent.

Voids of the ferromagnetic powder used in the present invention is preferably smaller. The amount of voids is 20% by volume or less, preferably 5% by volume or less.

The ferromagnetic powder used in the present invention can be prepared according to a publicly known method.

A conventional thermoplastic resin, thermosetting resin, reactive type resin and mixture thereof can be used as the binder for use in the present invention.

A preferred thermoplastic resin has a glass transition temperature of $-100°$ to $150°$ C., a number mean molecular weight of 1,000 to 200,000, preferably 10,000 to 100,000, and a polymerization degree of 50 to 1,000.

Examples thereof include a polymer or copolymer containing vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, and vinyl ether as a constitutional unit; a polyurethane resin; and various rubber resins.

Further, thermosetting resins or reactive type resins include a phenol resin, an epoxy resin, a polyurethane setting type resin, a urea resin, a melamine resin, an alkyd resin, an acryl series reactive resin, a formaldehyde resin, a silicon resin, an epoxypolyamide resin, a mixture of a polyester resin and an isocyanate prepolymer, a mixture of polyesterpolyol and polyisocyanate, and a mixture of polyurethane and polyisocyanate.

These resins are described in detail in *Plastic Handbook* published by Asakura Shoten.

It is possible as well to use a publicly known electron beam setting type resin. These examples and the manufacturing methods thereof are described in detail in JP-A-62-256219.

The above resins can be used singly or in combination. Preferred examples include a combination of a polyurethane resin and at least one resin selected from a vinyl chloride resin, a vinyl chloride-vinyl acetate resin, a vinyl chloride-vinyl acetate-vinyl alcohol resin, and a vinyl chloride-vinyl acetate-maleic anhydride copolymer; and a composition of such resins and a polyisocyanate.

Examples of the polyurethane resin include publicly known resins such as polyester polyurethane, polyether polyurethane, polyether polyester polyurethane, polycarbonate polyurethane, polyester polycarbonate polyurethane, and polycaprolactone polyurethane.

Preferable resins have at least one polar groups selected from —COOM, —SO$_3$M, —OSO$_3$M, —PO(OM)$_2$, —OPO(OM)$_2$ (wherein M represents a hydrogen atom or an alkali metal group), —OH, —NR$^2$, —N$^+$R$^3$ (wherein R$^2$ and R$^3$ each represents a hydrocarbon group), an epoxy group, —SH, and —CN by a copolymerization or an addition reaction according to necessity in order to obtain more excellent dispersibility and durability for all of the binders shown above. The amount of such polar group is from $10^{-1}$ to $10^{-8}$ mole/g, preferably from $10^{-2}$ to $10^{-6}$ mole/g.

Examples of the binders used in the present invention include VAGH, VYHH, VMCH, VAGF, VAGD, VROH, VYES, VYNC, VMCC, XYHL, XYSG, PKHH, PKHJ, PKHC, and PKFC each manufactured by Union Carbide Co., Ltd.; MPR-TA, MPR-TA5, MPR-TAL, MPR-TSN, MPR-TMF, MPR-TS, and MPR-TM each manufactured by Nissin Chemical Industry Co., Ltd.; 1000W, DX80, DX81, DX82, and DX83 each manufactured by Denki Kagaku Kogyo K.K.; MR110, MR100, and 400X110A each manufactured by Nippon Zeon Co., Ltd.; Nipporan N2301, N2302, and N2304 each manufactured by Nippon Polyurethane Co., Ltd.; Pandex T-5105, T-R3080 and T-5201, Burnok D-400 and D-210-80, and Crisvon 6109 and 7209 each manufactured by Dainippon Ink & Chemicals, Inc.; Byron UR8200, UR8300, UR8600, RV530, and RV280 each manufactured by Toyobo Co., Ltd.; Daipheramine 4020, 5020, 5100, 5300, 9020, 9022, and 7020 each manufactured by Dainichi Seika Colour & Chemicals Mfg. Co., Ltd.; MX 5004 manufactured by Mitsubishi Kasei Corporation; Sunprene SP-150 manufactured by Sanyo Chemical Industries, Ltd.; and Salan F310 and F210 each manufactured by Asahi Chemical Industry Co., Ltd.

The amount of the binder used in the present invention is from 5 to 50%, preferably from 10 to 30%, based on the amount of a magnetic substance contained in either of the first or second layer. Where polyurethane is used in the present invention, the glass transition temperature is preferably from −50° to 100° C., the percentage of elongation at break is preferably from 100 to 2,000%, the break stress is preferably from 0.05 to 1 kg/cm$^2$, and the yield point is preferably from 0.05 to 10 kg/cm$^2$.

Examples of polyisocyanate usable in the present invention include isocyanates such as tolylene diisocyanate, 4,4′-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates and polyalcohols; and polyisocyanates prepared by condensing isocyanates. The trade names of commercially available isocyanates are Coronate L, Coronate HL, Coronate 2030, Coronate 2031, Millionate MR, and Millionate MTL each manufactured by Nippon Polyurethane Co., Ltd.; Takenate D-102, Takenate D-110N, Takenate D-200, and Takenate D-202 each manufactured by Takeda Chemical Industries, Ltd.; and Desmodur L, Desmodur IL, Desmodur N, and Desmodur HL each manufactured by Sumitomo Bayer Co., Ltd. These isocyanates can be used in the first layer (a lower layer) and the second layer (an upper layer), singly or in combination of two or more, utilizing the difference in the hardening reactivities thereof.

Examples of carbon black usable in the present invention include furnace for rubber, thermal for rubber, black for coloring, and acetylene black. Carbon black used in the present invention has preferably a specific surface area of 5 to 500 m$^2$/g, a DBP oil absorption of 10 to 400 ml/100 g, a particle size of 5 to 300 mμ, a pH of 2 to 10, a water content of 0.1 to 10%, and a tap density of 0.1 to 1 g/ml.

Specific examples of carbon black used in the present invention include Blackpearls 2000, 1300, 1000, 900, 800, and 700, and Vulcan XC-702 each manufactured by Cabotto Co., Ltd; #80, #60, #55, #50, and #35 each manufactured by Asahi Carbon Co., Ltd.; #2400B, #2300, #900, #1000, #30, #40, and #10B each manufactured by Mitsubishi Kasei Corporation; and Conductex SC, Raven 150, 50, 40, and 15 each manufactured by Columbia Carbon Co., Ltd. Carbon black may be subjected to surface-treatment with a dispersant, may be grafted with a resin. Carbon black in which a part of its surface is graphited may be used. Further, carbon black may be dispersed in a binder before being added to a magnetic coating composition.

These carbon blacks can be used singly or in combination thereof. Where carbon black is used, the amount present is from 0.1 to 30% based on amount of ferromagnetic powder.

Carbon black functions, for example, as anti-electrification material, to reduce the friction coefficient, to provide light-shielding properties, and to increase layer strength of the magnetic layer. These functions are varied according to the carbon black used. Accordingly, it is possible to select the carbon black for the right purpose based on various characteristics such as particle size, oil absorption, electric conductivity and pH while changing kind, amount and combination thereof in the respective layers.

Carbon black which can be used in the present invention is disclosed in, for example, *Carbon Black Handbook* edited by Carbon Black Association.

Examples of abrasives which can be used in the present invention include the publicly known materials having primarily a Mohs' hardness of 6 or more, such as α-alumina having an α-conversion rate of 90% or more, β-alumina, silicon carbide, chromium oxide, cerium oxide, α-iron oxide, corundum, artificial diamond, silicon nitride, titan carbide, titanium oxide, silicon dioxide, and boron nitride. They can be used singly or in combination thereof. Also, there may be used the composites of these abrasives, which are prepared by subjecting abrasives to a surface treatment with other abrasives. These abrasives contain compounds or elements other than the main components in certain instances, but the effects thereof remain unchanged if the content of the main component is 90% by weight or more.

The particle size of these abrasives is preferably from 0.01 to 2 μm. According to necessity, abrasives having different particle sizes are used in combination or even a single abrasive itself can have a similar effect by broadening the particle size distribution thereof. These abrasives preferably have a tap density of 0.3 to 2 g/ml, a water content of 0.1 to 5%, a pH of 2 to 11, and a specific surface area of 1 to 30 m$^2$/g.

The abrasives used in the present invention may have any one of acicular, spherical and cubic-like shapes, but they preferably have a projections on a part thereof in order to provide high abrasive property.

Concrete examples of the abrasives used in the present invention include AKP-20, AKP-30, AKP-50, and HIT50 each manufactured by Sumitomo Chemical Co., Ltd.; G5, G7, and S-1 each manufactured by Nippon Chemical Industrial Co., Ltd.; and 100ED and 140ED each manufactured by Toda Kogyo Corp.

These abrasives may be added to a magnetic coating composition after dispersing in a binder in advance.

Additives used in the present invention include compounds having lubricating effect, antistatic effect, dispersing effect and plasticizing effect. Examples thereof include molybdenum disulfide; tungsten disulfide; graphite; boron nitride; fluorinated graphite; silicon oil; silicon having a polar group; fatty acid-modified silicon; fluorine-containing silicon; fluorine-containing alcohols; fluorine-containing esters; polyolefins; polyglycols; alkylphosphoric acid esters and alkali metal salts thereof; alkylsulfuric acid esters and alkali metal salts thereof; polyphenyl ethers; fluorine-containing alkylsulfuric acid esters and alkali metal salts thereof; monobasic fatty acids having from 10 to 24 carbon atoms (which may have an unsaturated bond or may be branched) and metal salts thereof (Li, Na, K, and Cu); monovalent, divalent, trivalent, tetravalent, pentavalent and hexavalent alcohols each having from 12 to 22 carbon atoms (which may have an unsaturated bond or may be branched), alkoxy alcohols having from 12 to 22 carbon atoms; monofatty acid esters, difatty acid esters or trifatty acid esters prepared from monobasic fatty acids having from 10 to 24 carbon atoms (which may have an unsaturated bond or may be branched), and any one of monovalent, divalent, trivalent, tetravalent, pentavalent and hexavalent alcohols each having from 12 to 22 carbon atoms (which may have an unsaturated bond or may be branched); fatty acid esters of monoalkyl ethers of alkylene oxide polymers; fatty acid amides having from 8 to 22 carbon atoms; and aliphatic amines having from 8 to 22 carbon atoms.

Concrete examples thereof include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Also, nonionic surface active agents can be used such as alkylene oxides, glycerines, glycidols type, and an alkylphenol ethylene oxide adducts; cationic surface active agents such as cyclic amines, ester amides, quaternary ammonium salts, hydantoin derivatives, heterocyclic compounds, phosphoniumcompounds, and sulfonium compounds; anionic surface active agents having acidic groups such as carboxylic acid, sulfonic acid, phosphoric acid, sulfuric acid ester, and phosphoric acid ester; and amphoteric surface active agents such as amino acids, aminosulfonic acids, sulfuric acid esters or phosphoric acid esters of aminoalcohols, and alkylbetaines. The details of these surface active agents are described in *Surface Active Agents Handbook* published by Sangyo Books Co., Ltd.

These lubricants, antistatic agents, and others may not be necessarily 100% pure and may contain impurities such as isomers, unreacted components, by-products, decomposed products, or oxides in addition to the main components. The content of these impurities is preferably 30% by weight or less, more preferably 10% by weight or less.

The kinds and amounts of these lubricants and surfactants used in the present invention can be properly used in the respective layers according to necessity.

All or a part of the additives used in the present invention may be added at any step of manufacturing a magnetic coating composition; for example, mixed with a ferromagnetic powder before kneading; added at the step of kneading with a ferromagnetic powder, a binder and a solvent; added at a dispersing step; added after dispersing; and added immediately before coating.

The organic solvents used in the present invention are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydro-carbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

The process for manufacturing the magnetic coating composition used for the magnetic recording medium of the present invention comprises at least a kneading step, a dispersing step and a mixing step which is provided before and after these steps according to necessity. Each of these steps may be divided into two or more stages.

All materials used in the present invention, such as a ferromagnetic powder, a binder, carbon black, an abrasive, an antistatic agent, a lubricant, and a solvent may be added before or in the course of any of these steps. Further, each material may be divided and added at two or more steps. For example, polyurethane may be added separately at a kneading step, a dispersing step, and a mixing step for adjusting viscosity after dispersion.

A publicly known technique can be used in order to achieve the objects of the present invention. The use of kneaders having a strong kneading power such as an open kneader, a pressurized kneader, a continuous kneader, and an extruder at the kneading step can raise an elastic modulus of a magnetic layer.

In the magnetic recording medium of the present invention, an upper magnetic layer is preferably a thin layer with a thickness of 1.5 $\mu$m or less, and therefore a simultaneous multilayer coating method as shown in JP-A-62-212933 is preferably used as the coating method therefor. A solenoid with 1,000 G (gauss) or more or a cobalt magnet with 2,000 G is used for orientation. A suitable drying step may be provided in advance before orientation. The selection of an orientation condition changes the orientation of a magnetic layer and can control the ratio of the elastic moduli in the longer direction and the width direction of the magnetic layer.

The magnetic recording medium of the present invention is generally subjected to a calendaring treatment with a metal roll and a plastic roll or two metal rolls. Preferred as the plastic rolls include ones made of the materials such as nylon, epoxy, polyimide, polyamide, and polyimidoamide. Roll temperature in the calendaring treatment is from 40° to 120° C., and pressure is from 100 to 50 kg/mm². The higher the temperature and pressure are, the more the elastic modulus of the magnetic layer is raised.

EXAMPLES

The present invention will be explained in further details with reference to the examples. It can be readily understood by the person ordinarily skilled in the art that the components, ratios, procedures, and others can be changed as long as they do not deviate from the scope of the present invention.

Accordingly, the present invention should not be limited to the following examples.

In the examples, a "part" means a "part by weight".

Example 1

| Magnetic coating composition A | |
| --- | --- |
| Ferromagnetic powder | 100 parts |
| Cobalt-modified iron oxide | |
| (Hc: 900 Oe, $\sigma_s$: 75 emu/g, | |
| a specific surface area: 50 m²/g, | |
| an acicular ratio: 9) | |
| Vinyl chloride resin | 10 parts |
| (polymerization degree: 350, an | |
| SO$_3$Na salt: present at 5 × 10$^{-4}$ mol/g) | |
| Polyurethane resin | 6 parts |
| (a number mean molecular weight: | |
| 50,000, an SO$_3$Na salt: present at | |
| 4 × 10$^{-5}$ mol/g) | |
| Carbon black | 3 parts |
| (a mean particle size: 80 mμ) | |
| α-Alumina | 4 parts |
| (a mean particle size: 0.2 μm) | |
| Stearic acid | 2 parts |
| Oleic acid | 1 part |
| Butyl stearate | 2 parts |
| Cyclohexanone | 50 parts |

After the above composition was kneaded with a kneader, butyl acetate (200 parts) was added, and the mixture was dispersed with a sand mill, followed by adding a polyisocyanate hardener (6 parts), whereby a magnetic coating composition was prepared.

Magnetic coating composition A was coated on a polyethylene naphthalate film having a thickness of 11 μm and an elastic modulus of 700 kg/mm² each in a longer direction and a width direction so that the dried thickness became 3.0 μm, and the coated film was subjected to an orientation treatment with a cobalt magnet and a solenoid of 2,000 G, followed by drying. Then, the coated film was subjected to a calendaring treatment at a roll temperature of 80° C. and cut to a ½ inch width with a slitter. The characteristics of the tape thus obtained are shown in Sample No. A-1 of Table 1.

Example 2

Sample No. A-2 was prepared in the same manner as Example 1 except that the polymerization degree of the vinyl chloride resin was changed to 400, the added amount (by weight) thereof was changed to 12 parts, and the added amount (by weight) of the polyurethane resin was changed to 4 parts.

Example 3

Sample No. A-3 was prepared in the same manner as Example 2 except that the acicular ratio was changed to 6, and the amount of cyclohexanone was changed to 40 parts, and the orientation was carried out only with a cobalt magnet.

Example 4

Sample No. A-4 was prepared in the same manner as Example 2 except that the amount of cyclohexanone was changed to 40 parts, the amount of isocyanate was changed to 8 parts, and the temperature of the calendaring roll was changed to 100° C.

Example 5

Sample No. A-5 was prepared in the same manner as Example 1 except that the non-magnetic support was replaced with a reinforced polyethylene terephthalate film having an elastic modulus of 600 kg/mm² each in the longer direction and width direction.

Example 6

Sample No. A-6 was prepared in the same manner as Example 2 except that the non-magnetic support was replaced with a reinforced polyethylene terephthalate film having an elastic modulus of 600 kg/mm² each in the longer direction and width direction.

Example 7

Sample No. A-7 was prepared in the same manner as Example 3 except that the non-magnetic support was replaced with a reinforced polyethylene terephthalate film having an elastic modulus of 600 kg/mm² each in the longer direction and width direction.

Example 8

Sample No. A-8 was prepared in the same manner as Example 2 except that the non-magnetic support was replaced with a polyethylene naphthalate film having an elastic modulus of 1,000 kg/mm² in the longer direction and that of 500 kg/mm² in the width direction.

Example 9

Sample No. A-9 was prepared in the same manner as Example 2 except that the non-magnetic support was replaced with a polyaramide film having an elastic modulus of 1,000 kg/mm² each in the longer direction and width direction.

Comparative Example 1

Sample No. B-1 was prepared in the same manner as Example 1 except that the non-magnetic support was replaced with a polyethylene terephthalate film having an elastic modulus of 500 kg/mm² each in the longer direction and width direction.

Comparative Example 2

Sample No. B-2 was prepared in the same manner as Example 1 except that the polymerization degree of the vinyl chloride resin was changed to 300, the polar group was changed to —COOH, the added amount of the polar group was changed to 1×10$^{-5}$ mol/g, the amount (by weight) of the vinyl chloride resin was changed to 8 parts, the added amount of the polyurethane resin was changed to 8 parts, the amount of cyclohexanone was changed to 70 parts, and the temperature of the calendaring roll was changed to 60° C.

Comparative Example 3

Sample No. B-3 was prepared in the same manner as Example 1 except that the polymerization degree of the vinyl chloride resin was changed to 300, the polar group was changed to —COOH, the amount of the polar group was changed to 1×10$^{-5}$ mol/g, the added amount (by weight) of the vinyl chloride resin was changed to 8 parts, and the added amount (by weight) of polyurethane resin was changed to 8 parts.

Comparative Example 4

Sample No. B-4 was prepared in the same manner as Example 5 except that the added amount (by weight) of the vinyl chloride resin was changed to 16 parts, and the polyurethane resin was removed.

Example 10

| Magnetic coating composition B for an upper magnetic layer | |
|---|---|
| Ferromagnetic powder | 100 parts |
| Cobalt-modified iron oxide | |
| (Hc: 900 Oe, $\sigma_s$: 75 emu/g, | |
| a specific surface area: 50 m$^2$/g, | |
| an acicular ratio: 9) | |
| Vinyl chloride resin | 12 parts |
| (polymerization degree: 350, | |
| an —SO$_3$Na group: present at $5 \times 10^{-4}$ mol/g) | |
| Polyurethane resin | 4 parts |
| (a number mean molecular weight: 50,000, an —SO$_3$Na group: present at $4 \times 10^{-5}$ mol/g) | |
| Carbon black | 3 parts |
| (a mean particle size: 80 mµ) | |
| α-Alumina | 4 parts |
| (a mean particle size: 0.2 µm) | |
| Stearic acid | 2 parts |
| Oleic acid | 1 part |
| Butyl stearate | 2 parts |
| Cyclohexanone | 50 parts |

| Magnetic coating composition C for a lower magnetic layer | |
|---|---|
| Ferromagnetic powder | 100 parts |
| Cobalt-modified iron oxide | |
| (Hc: 800 Oe, $\sigma_s$: 77 emu/g, | |
| a specific surface area: 40 m$^2$/g, | |
| an acicular ratio: 8) | |
| Vinyl chloride resin | 10 parts |
| (polymerization degree: 350, | |
| an —SO$_3$Na group: present at $5 \times 10^{-4}$ mol/g) | |
| Polyurethane resin | 6 parts |
| (a number mean molecular weight: 50,000, an SO$_3$Na salt: present at $4 \times 10^{-5}$ mol/g) | |
| Carbon black | 3 parts |
| (a mean particle size: 80 mµ) | |
| α-Alumina | 4 parts |
| (a mean particle size: 0.2 µm) | |
| Stearic acid | 2 parts |
| Oleic acid | 1 part |
| Butyl stearate | 2 parts |
| Cyclohexanone | 60 parts |

After each of the above compositions was kneaded with a kneader, butyl acetate (200 parts) was added and the mixture was dispersed with a sand mill, followed by adding a polyisocyanate hardener (6 parts), whereby the magnetic coating composition B for the upper magnetic layer and the magnetic coating composition C for the lower magnetic layer were prepared.

The magnetic coating compositions B and C thus obtained were coated on a polyethylene naphthalate film having a thickness of 11 µm and an elastic modulus of 700 kg/mm$^2$ each in the longer direction and width direction with a simultaneous multilayer coating method so that a dried thickness became 0.5 µm for the upper magnetic layer and 3.0 µm for the lower magnetic layer, and the coated film was subjected to an orientation treatment with a cobalt magnet and a solenoid of 2,000 G, followed by drying. Then, the coated film was subjected to a calendaring treatment at a roll temperature of 80° C. and cut to a ½ inch width with a slitter. The characteristics of the tape thus obtained are shown in Sample No. A-10 of Table 1.

Example 11

Sample No. A-11 was prepared in the same manner as Example 10 except that the amount of cyclohexanone contained in the magnetic coating composition for the upper magnetic layer was changed to 40 parts, and the amount of cyclohexanone contained in the magnetic coating composition for the lower magnetic layer was changed to 70 parts.

Example 12

Sample No. A-12 was prepared in the same manner as Example 10 except that the polymerization degree of the vinyl chloride resin was changed to 400, the amount of the vinyl chloride was changed to 16 parts, the amount of the polyurethane resin was changed to 0, and the amount of cyclohexanone was changed to 40 parts, each of which was contained in the magnetic coating composition for the upper magnetic layer, and the polymerization degree of the vinyl chloride resin was changed to 300, the amount of vinyl chloride was changed to 8 parts, the added amount of the polyurethane resin was changed to 8 parts, and the amount of cyclohexanone was changed to 70 parts, each of which was present in the magnetic coating composition for the lower magnetic layer.

Example 13

Sample No. A-13 was prepared in the same manner as Example 10 except that the magnetic substance contained in the magnetic coating composition for the upper magnetic layer was replaced with a ferromagnetic metal powder having an Hc of 1,700 Oe, $\sigma_s$ of 130 emu/g, a specific surface area of 60 m$^2$/g and an acicular ratio of 8.

Example 14

Sample No. A-14 was prepared in the same manner as Example 10 except that the non-magnetic support was replaced with a polyethylene naphthalate film having a thickness of 5 µm.

The samples thus obtained were evaluated as described below. The results thereof are shown in Tables 1 to 3.

TABLE 1

| | Elastic modulus of the non-magnetic support | | |
|---|---|---|---|
| Sample No. | A*$^1$ (kg/mm$^2$) | B*$^2$ | Kind |
| B-1 | 500 | 500 | Polyethylene terephthalate |
| B-2 | 700 | 700 | Polyethylene naphthalate |
| B-3 | 700 | 700 | Polyethylene naphthalate |
| A-1 | 700 | 700 | Polyethylene naphthalate |
| A-2 | 700 | 700 | Polyethylene naphthalate |
| A-3 | 700 | 700 | Polyethylene naphthalate |
| A-4 | 700 | 700 | Polyethylene naphthalate |
| A-5 | 600 | 600 | Reinforced polyethylene terephthalate |
| A-6 | 600 | 600 | Reinforced polyethylene terephthalate |
| A-7 | 600 | 600 | Reinforced polyethylene terephthalate |
| B-4 | 600 | 600 | Reinforced polyethylene terephthalate |
| A-8 | 1000 | 500 | Polyethylene naphthalate |
| A-9 | 1000 | 1000 | Polyaramide |
| A-10 | 700 | 700 | Polyethylene naphthalate |
| A-11 | 700 | 700 | Polyethylene naphthalate |
| A-12 | 700 | 700 | Polyethylene naphthalate |

TABLE 1-continued

| Sample No. | Elastic modulus of the non-magnetic support | | Kind |
|---|---|---|---|
| | A*1 (kg/mm²) | B*2 | |
| A-13 | 700 | 700 | Polyethylene naphthalate |
| A-14 | 700 | 700 | Polyethylene naphthalate |

*1: Longer direction
*2: Width direction

TABLE 2

| Sample No. | Elastic modulus of the magnetic layer | | Elastic modulus of the upper magnetic layer | | Elastic modulus of the lower magnetic layer | |
|---|---|---|---|---|---|---|
| | A*1 (kg/mm²) | B*2 (kg/mm²) | A*1 (kg/mm²) | B*2 (kg/mm²) | A*1 (kg/mm²) | B*2 (kg/mm²) |
| B-1 | 1000 | 500 | | | | |
| B-2 | 400 | 200 | | | | |
| B-3 | 500 | 250 | | | | |
| A-1 | 600 | 300 | | | | |
| A-2 | 1000 | 500 | | | | |
| A-3 | 1000 | 700 | | | | |
| A-4 | 2000 | 1000 | | | | |
| A-5 | 600 | 300 | | | | |
| A-6 | 1000 | 500 | | | | |
| A-7 | 1000 | 700 | | | | |
| B-4 | 2000 | 1000 | | | | |
| A-8 | 1000 | 500 | | | | |
| A-9 | 1000 | 500 | | | | |
| A-10 | 1000 | 500 | 1250 | 700 | 950 | 450 |
| A-11 | 1000 | 500 | 1500 | 1000 | 900 | 400 |
| A-12 | 1000 | 500 | 2000 | 1250 | 800 | 350 |
| A-13 | 1000 | 500 | 1250 | 750 | 950 | 450 |
| A-14 | 1000 | 500 | 1250 | 750 | 950 | 450 |

*1: Longer direction
*2: Width direction

TABLE 3

| Sample No. | Thickness of the magnetic recording medium (μm) | Dropping of scratched powder at the tape edge portion | Audio output reduction (dB) | Video output reduction (dB) |
|---|---|---|---|---|
| B-1 | 14 | XX | 5 | 3 |
| B-2 | 14 | XX | 5 | 3 |
| B-3 | 14 | X | 3 | 2 |
| A-1 | 14 | △ | 1 | 0 |
| A-2 | 14 | ○ | 0 | 0 |
| A-3 | 14 | ○ | 1 | 1 |
| A-4 | 14 | △ | 0 | 0 |
| A-5 | 14 | △ | 1 | 0 |
| A-6 | 14 | ○ | 1 | 1 |
| A-7 | 14 | ○ | 1 | 0 |
| B-4 | 14 | X | 3 | 2 |
| A-8 | 14 | ○ | 0 | 0 |
| A-9 | 14 | ○ | 0 | 0 |
| A-10 | 14 | ○ | 0 | 0 |
| A-11 | 14 | ○ | 0 | 0 |
| A-12 | 14 | △ | 1 | 1 |
| A-13 | 14 | ○ | 0 | 0 |
| A-14 | 8 | ○ | 0 | 0 |

Evaluation methods (1) Elastic modulus of a support

After removing the magnetic layer and the back coating layer with cyclohexanone, tensile strength was measured with a tensile tester (Tensilon STM-T-50BP manufactured by Orientech Co., Ltd) at a tensile speed of 200%/second at 23° C. and 70% RH to obtain an elastic modulus at an elongation of 0.5%.

(2) Elastic modulus of a magnetic layer

The elastic moduli of the magnetic recording medium and support (including a back coating layer if it is provided) remaining after removing only a magnetic layer from the magnetic recording medium, were separately measured in a similar manner, and the elastic modulus $E_M$ of the magnetic layer was calculated using the following equation:

$$E_M = (E_T d_T - E_B d_B)/d_M$$

$E_T$: elastic modulus of the magnetic recording medium (kg/mm²)

$E_B$: elastic modulus of the non-magnetic support (kg/mm²)

$E_M$: elastic modulus of the magnetic layer (kg/mm²)

$d_T$: thickness of the magnetic recording medium (mm)

$d_B$: thickness of the non-magnetic support (mm)

$d_M$: thickness of the magnetic layer (mm)

Where the magnetic layer was a multilayer, the elastic modulus was obtained by any of the following methods.

1) The respective layers are coated to a thickness of 3 μm at a prescribed condition, and the elastic modulus $E_m$ of the magnetic layer is obtained in a similar manner.

2) An upper magnetic layer is removed with an abrasive tape, and the elastic modulus $E_L$ of the lower magnetic layer is obtained in a similar manner. The elastic modulus $E_U$ of the upper magnetic layer is obtained from the elastic modulus of all of the magnetic layers using the following equation:

$$E_U = (E_M d_M - E_L d_L)/d_U$$

$E_M$: elastic modulus of the magnetic layer (kg/mm²)

$E_L$: elastic modulus of the lower magnetic layer (kg/mm²)

$E_U$: elastic modulus of the upper magnetic layer (kg/mm²)

$d_M$: total thickness of the magnetic layer (mm)

$d_L$: thickness of the lower magnetic layer (mm)

$d_U$: thickness of the upper magnetic layer (mm)

(3) Dropping of scratched powders at the tape edge portion and output reduction:

Each tape was run 100 passes in an S-VHS deck HR-S7000 manufactured by Victor Co. of Japan, Ltd., and the edge of the tape after running was observed with a microscope (−100) to classify the degree of damage to the following grades:

xx: notable edge damage observed over the whole length.
x: edge damage observed over the whole length.
Δ: partial edge damage observed.
o: no edge damage observed.

A tape on which an audio signal of 1 kHz and an RF signal had been recorded in advance was run 100 passes and then reduction thereof was measured to determine audio output reduction and video output reduction.

As shown in Table 1, it can be found that the magnetic recording media according to the present invention, in which the elastic moduli of the non-magnetic support and magnetic layer in the longer direction and width direction are controlled in the prescribed ranges, for example, Tapes A-1 to A-9, have less dropping of scratched powders at the edge portion and less audio output reduction as compared with Conventional Tapes B-2 to B-4 in which a high strength support is used as well as Tape B-1 in which a conventional support is used.

Further, in Tapes A-10 to A-14, which are the multi-layered media, the ratios of the non-magnetic supports and magnetic layers are controlled in the prescribed range, and therefore they have less dropping of scratched powder at the edge portion and audio output reduction. In particular, Tapes A-10, A-11, A-13 and A-14 in which the ratios of the elastic moduli of the upper and lower magnetic layers are controlled in the range according to the present invention show a particularly preferred durability.

In a magnetic recording medium, the sum of the elastic modulus in a longer direction of the non-magnetic support and the elastic modulus in a width direction thereof was set at 1,250 kg/mm$^2$ or more, the elastic modulus in a longer direction of the magnetic layer was set at 0.6 to 3.0 times as much as the elastic modulus in a longer direction of the non-magnetic support, and the elastic modulus in a width direction of the magnetic layer was set at 0.4 to 2.0 times as much as the elastic modulus in a width direction of the non-magnetic support, whereby a magnetic recording medium having excellent durability and enabling a longer recording was obtained. Further, an excellent magnetic recording medium having no dropping of edge powders at the tape edge portion, no audio output reduction and no video output reduction was obtained.

While the invention has been described in detail and with reference to specific embodiments thereof, it will be apparent to one skilled in the art that various changes and modifications can be made therein without departing from the spirit and scope thereof.

What is claimed is:

1. A magnetic tape recording medium comprising a magnetic layer containing a ferromagnetic powder dispersed in a binder on a non-magnetic support, wherein the sum of the elastic modulus of the non-magnetic support in the running direction of the tape and the elastic modulus of the non-magnetic support in the cross direction of the tape is 1,250 kg/mm$^2$ or more; the elastic modulus of the magnetic layer in the running direction of the tape is 0.6 to 3.0 times as much as the elastic modulus of the non-magnetic support in the running direction of the tape; and the elastic modulus of the magnetic layer in the cross direction of the tape is 0.4 to 2.0 times as much as the elastic modulus of the non-magnetic support in the cross direction of the tape.

2. The magnetic tape recording medium as in claim 1, wherein the total thickness of the tape is from 4 to 25 μm.

3. The magnetic tape recording medium as in claim 1, wherein the sum of the elastic modulus of the non-magnetic support in the running direction of the tape and the elastic modulus of the non-magnetic support in the cross direction of the tape is 1,400 kg/mm$^2$ or more; the elastic modulus of the magnetic layer in the running direction of the tape is 1.0 to 2.0 times as much as the elastic modulus of the non-magnetic support in the running direction of the tape; the elastic modulus of the magnetic layer in the cross direction of the tape is 0.6 to 1.5 times as much as the elastic modulus of the non-magnetic support in the cross direction of the tape; and the total thickness of the magnetic tape is 15 μm or less.

4. The magnetic tape recording medium as in claim 1, wherein the magnetic layer comprises at least two magnetic layers, and the lowest elastic modulus of the respective magnetic layers in both the running direction and the cross direction of the tape is 0.5 to 1.0 time as much aS the highest elastic modulus of the respective magnetic layers.

5. The magnetic tape recording medium as in claim 1, wherein the non-magnetic support is made of at least one material selected from the group consisting of polyethylene naphthalate, polyaramide, polyamide, polyimide, and reinforced polyethylene terephthalate.

6. The magnetic tape recording medium as in claim 1, wherein the non-magnetic support is made of at least one material selected from the group consisting of polyethylene naphthalate and polyaramide.

7. The magnetic tape recording medium as in claim 1, wherein each of the elastic moduli of the non-magnetic support in each of the running direction and the cross direction of the tape is within the range of 400 to 2,000 kg/mm$^2$.

8. The magnetic tape recording medium as in claim 1, wherein the non-magnetic support has a center-line average surface roughness of 0.03 μm or less.

9. The magnetic tape recording medium as in claim 1, wherein the non-magnetic support has a load value at a 5% elongation of 10 kg/mm$^2$ or more in each of the running direction and the cross direction of the tape.

10. The magnetic tape recording medium as in claim 1, wherein the non-magnetic support has a break strength of 20 kg/mm$^2$ or more in the running direction of the tape.

11. The magnetic tape recording medium as in claim 1, wherein the non-magnetic support has a thickness of 3 to 20 μm.

12. The magnetic tape recording medium as in claim 1, wherein the magnetic layer has a total thickness of 0.5 to 7 μm.

13. The magnetic tape recording medium as in claim 1, wherein the total thickness of the magnetic layer is 1/20 to 2 times as much as the thickness of the non-magnetic support.

* * * * *